United States Patent [19]
Sara

[11] Patent Number: 5,413,816
[45] Date of Patent: May 9, 1995

[54] METHOD OF FORMING AN ALUMINUM PROTECTIVE COATING ON A CARBON-CARBON COMPOSITE

[75] Inventor: Raymond V. Sara, Strongsville, Ohio

[73] Assignee: UCAR Carbon Technology Corporation, Danbury, Conn.

[21] Appl. No.: 813,027

[22] Filed: Dec. 24, 1991

[51] Int. Cl.$^6$ .......................... B05D 3/00; B05D 3/02; B05D 5/00; B05D 1/36
[52] U.S. Cl. ..................... 427/294; 427/228; 427/229; 427/192; 427/376.7; 427/399; 427/404; 427/419.7
[58] Field of Search ............ 427/228, 229, 192, 376.7, 427/399, 404, 419.7; 428/408

[56] References Cited

U.S. PATENT DOCUMENTS

| | | | |
|---|---|---|---|
| 4,104,417 | 8/1978 | Sara | 427/37 |
| 4,252,856 | 2/1981 | Sara | 428/408 |
| 4,347,083 | 8/1982 | Sara | 75/204 |

*Primary Examiner*—Charles T. Jordan
*Attorney, Agent, or Firm*—F. J. McCarthy

[57] ABSTRACT

A method of forming an oxidation resistant aluminum coating on a carbon-carbon composite comprising applying a slurry over the carbon-carbon composite, composed of an aluminum intermetallic in a liquid suspending vehicle including a high char yield adhesive thermoplastic and a glassy carbon, distributing aluminum, in elemental form, over the coated surface and reacting the composite and coating in a furnace.

6 Claims, No Drawings

METHOD OF FORMING AN ALUMINUM PROTECTIVE COATING ON A CARBON-CARBON COMPOSITE

FIELD OF INVENTION

This invention relates to a process for forming an oxidation resistant aluminum coating on a carbon-carbon composite.

BACKGROUND OF INVENTION

Carbon-carbon composites are important materials for aerospace and other applications which require high strength and toughness at high temperature. The use of carbon-carbon materials are limited because of their susceptibility to oxidation, particularly at elevated temperatures. Oxidation protection may be provided by coating the carbon-carbon composite with an oxidation resistant metal such as e.g., aluminum. Aluminum is desirable because of its high electrical conductivity, high thermal conductivity and light weight characteristics. Although processes for bonding aluminum to graphite have been developed whereby aluminum is chemically bonded to carbon or graphite by the formation of $Al_4C_3$; such bondings are susceptible to humid conditions and readily peel or flake off. The low thermal expansion characteristic of carbon-carbon and its low surface reactivity make it extremely difficult to apply a uniform coating of aluminum to a carbon-carbon material which will chemically adhere to the carbon-carbon surface without distortion and without cracking or delaminating in response to thermal swings.

An improved method for forming a chemically bonded aluminum coating to a carbonaceous article with a metal carbide interface is disclosed in U.S. Pat. Nos. 4,104,417; 4,347,083 and 4,252,856 respectively. In accordance with the teachings of these patents titanium, hafnium or tantalum may be used to bond aluminum to carbon via an intermediary bond or intermetallic phase, formed in situ, of titanium carbide, hafnium carbide or tantalum carbide. A tantalum-aluminum containing mixture or slurry is deposited on a carbon substrate and the carbon substrate is then heated in an inert atmosphere to form a thin aluminum outercoat chemically bonded to the carbon substrate via a metal carbide interface of tantalum carbide. This process produces excellent results for a carbonaceous substrate of carbon or graphite other than carbon-carbon. When applied to a carbon-carbon composite the coating spalls and flakes off and the aluminum distorts.

SUMMARY OF THE INVENTION

A method has been discovered in accordance with the present invention to apply the teachings of the aforementioned patents to a carbon-carbon composite for forming, in situ, a uniform outer layer of aluminum upon a carbon-carbon composite through an intermediary bond of an intermetallic metal carbide interface of tantalum, titanium or hafnium. The method of the present invention for forming an aluminum coating over a carbon-carbon composite in situ comprises the steps of:

(a) forming a slurry composed of particles of an intermetallic of aluminum and a metal selected from the group consisting of tantalum, titanium and hafnium in a liquid suspending vehicle composed of a relatively high char yield adhesive thermoplastic composition and a source of carbon selected from the group consisting of glassy carbon and graphite;

(b) spreading said aluminum intermetallic slurry over said carbon-carbon composite to form a coating;

(c) distributing aluminum in elemental form on the surface of said coating in a concentration of between 0.27 $g/in^2$ and 0.4 $g/in^2$; and (d) reacting said carbon-carbon composite and coating in an evacuated furnace heated to between 850° C. and 1500° C. for a controlled time period to form a dense impermeable aluminum coating chemically bonded to said carbon-carbon composite.

DETAILED DESCRIPTION OF THE INVENTION

A conventional carbon-carbon composite is a material composed of a woven or non-woven fabric of carbon fibers with a carbonaceous material directly bonded to the carbon fibers to form a unitary structure. An example of a carbon-carbon composite is a woven fabric of carbon fibers obtained by carbonizing polyacrylonitrile (PAN) fibers, forming a shaped substrate from the carbon fibers and depositing a pyrolytic material such as pyrolytic carbon on the carbon fibers. The deposition of carbon is typically carried out by introducing a hydrocarbon gas into a furnace containing the carbon fiber substrate under conditions permitting the gas to decompose and carbonize at the surface of the carbon fibers.

A protective layer of aluminum may be formed, in situ, at the surface of the carbon-carbon composite body by reacting an aluminum intermetallic compound of aluminum and either tantalum, titanium or hafnium with the carbon-carbon composite body in the presence of a critical amount of elemental aluminum preferably disposed upon the surface of the intermetallic compound before it is reacted with the carbon-carbon composite. The preferred aluminum intermetallic is aluminum tantalum which is preferably applied in a liquid suspending vehicle to form a uniform deposit over the carbon-carbon composite. Elemental aluminum must be uniformly distributed upon the surface of the aluminum tantalum intermetallic coating in a concentration of between 0.27 $g/in^2$ and 0.4 $g/in^2$. The intermetallic aluminum hafnium or aluminum titanium may be effectively used as a substitute for the aluminum tantalum.

The liquid suspending vehicle should comprise a source of carbon, preferably glassy carbon or graphite and a resinous adhesive binder which provides an independent source of carbon upon pyrolytic decomposition. The resin adhesive may be a thermoplastic resin such as a phenolic resin dissolved in alcohol, methyl ethyl ketone or acetone. The pyrolyzing binder should have a char yield of at least 3%. The source of carbon, preferably glassy carbon, is present in the slurry mixture between about 1-6% by weight. The composition may also include a conventional anti-settling agent such as MPA 1075 available commercially from NL Chemicals of Hightstown, N.J. U.S.A.

The liquid suspending vehicle when combined with the aluminum intermetallic compound provides a viscous slurry which may be readily applied to the surface of the carbon-carbon body. The thermoplastic resin provides adhesion to cement the intermetallic compound to the carbon-carbon surface. The intermetallic aluminum compound should be in the form of a power sized between about 150 Tyler mesh and 325 Tyler mesh or finer.

After uniformly coating the carbon-carbon composite with the slurry of an aluminum intermetallic compound and thermoplastic adhesive, aluminum in its elemental form is dispersed over the coated slurry in a concentration of from 0.27 g/in$^2$ to 0.4 g/in$^2$ with an optimum dispersion of 0.34 g/in$^2$ ±0.07 g/in$^2$. The aluminum can be applied as individual particles and sprinkled over the slurry or added through a volatile solvent or as a separately formed slurry in a liquid suspending vehicle such as polyvinyl alcohol, methanol isopropyl alcohol or water. The amount of added aluminum is critical in that too little aluminum will not permit a uniformly adherent aluminum coating to form. Instead the coating will flake off and delaminate upon thermal cycling. Moreover, unless at least 0.27 g/in$^2$ is added before the slurry is reacted the aluminum coating is too permeable to provide adequate oxidation protection. Conversely, if too much aluminum is added i.e. above 0.4 g/in$^2$ aluminum carbide is formed which is hygroscopic and likewise unacceptable for oxidation protection.

The coated carbon-carbon composite material is heated in an evacuated furnace preferably in an inert atmosphere at a peak temperature of between 850° C. and 1500° C. The intermetallic Al$_{13}$Ta reacts with the carbon to form an interfacial layer of tantalum carbide and permits the aluminum and aluminum byproduct from the reaction to combine to form a chemically bonded oxidation resistant coating of aluminum which will not peel, flake or delaminate provided elemental aluminum was present within the critical range before the coating is fired.

The following examples will serve to illustrate the concept of this invention:

EXAMPLE 1

A two dimensional oriented carbon-carbon composite specimen measuring 1½" square ×0.10" thick was air sprayed with a slurry containing the following ingredients:

35.0 g (-325 mesh) A$_{13}$Ti
2.94 g calcined glassy carbon
1.16 g MPA 1075 anti-settling agent
18.0 g 5:1 Methylethylketone:Goodrich cement A-851-B mixture The dried, coated sample was sandwiched between two pieces of 0.001" thick steel shim stock and isostatically pressed at 15000 psi for one minute. The sample then was placed on small ZrO$_2$ felt pads placed on a prebaked graphite slab. A dish of getter titanium powder was positioned near the specimen. The retort was evacuated and then purged continuously with oxygen-free argon. The furnace was heated at a rate of 1° C./min to 600° C. and then the rate was increased to 6° C./min to 995° C. where it was held for six minutes.

The coating was completely disbonded on one face and partially on the opposite side. Results shown here were similar for specimens which were not pressed prior to reaction bonding.

EXAMPLE 2

Two sample carbon/carbon composites measuring 1"×2"×0.3" and having orthogonal fiber alignment were first hand painted with slurries of Al$_3$Ti/C and Al$_3$Ta/C before overspraying with the same materials. The two layers provided a slightly thicker coating than one layer, but coating results were determined to be similar for both thicknesses. The Al$_3$Ti/C slurry composition was similar to the one presented in Example 1; the Al$_3$Ta/C slurry composition is as follows:

40.0 g A$_3$Ta
0.92 g calcined glassy carbon
2.32 g MPA 1075 anti-settling agent
37.74 g 5:1 Methylethylketone:Goodrich cement A-851-B mixture A thin layer of Al powder weighing 0.81 g was spread over the Al$_3$Ti/C coating and 0.55 g was spread over the Al$_3$Ta/C coating. The furnace chamber was evacuated with a mechanical pump before purging with oxygen-free argon. The two were fired simultaneously at a rate of 6° C. per minute to 975° C. and held for six minutes.

The two specimens had uniformly bonded coatings on all sides. The molten aluminum wetted all surfaces thereby creating dense, impermeable coatings which provided excellent oxidation protection.

EXAMPLE 3

A slurry consisting of 40 g. of 325 mesh Al$_3$Ta, 0.92 g calcined glassy carbon, 1.16 g. of MPA-1075 (anti-settling agent), 18.87 g of a 2:1 MEK phenolic resin mixture was homogenized by rolling in a ball mill for one hour. The as received phenolic resin has a char yield of 43.6%. The slurry was then air sprayed onto a 3"×3"×½ plate of ATS graphite. Approximately 1.75 of aluminum powder was dispersed on top of the dried slurry coating. The coated graphite was fired in a retort furnace to 1005° C. using a heating rate of 6°/min. hold time at peak temperature was 34 minutes. The chamber was continuously purged with a 0$_2$-free argon at a flow rate of 4 SCFH.

At the completion of the firing cycle, a smooth impervious metallic coating chemically bonded via TaC to the substrate was produced.

What I claim is:

1. A method for forming an aluminum coating over a carbon-carbon composite in situ comprising the steps of:
   (a) forming a slurry composed of particles of an intermetallic of aluminum and a metal selected from the group consisting of tantalum, titanium and hafnium in a liquid suspending vehicle composed of a resinous adhesive binder which provides a source of carbon upon pyrolytic decomposition having a minimum char yield of 3% and an independent source of carbon selected from the group consisting of glassy carbon and graphite in an amount of 1 to 6% by weight of the slurry;
   (b) spreading said aluminum intermetallic, carbon-containing char-yielding slurry over said carbon-carbon composite to form a coating;
   (c) distributing aluminum in elemental form on the surface of said coating in a concentration of between 0.27 g/in$^2$ and 0.4 g/in$^2$; and
   (d) reacting said carbon-carbon composite and coating in an evacuated furnace heated to between 850° C. and 1500° C. for a controlled time period to form a dense impermeable aluminum coating chemically bonded to said carbon-carbon composite.

2. A method as defined in claim 1 wherein said resinous adhesive binder in said slurry is a thermoplastic resin dissolved in alcohol, methyl ethyl ketone or acetone.

3. A method as defined in claim 2 wherein said thermoplastic resin is a phenolic resin.

4. A method as defined in claim 3 wherein said independent source of carbon is a glassy carbon in a concentration of between 1–6% by weight.

5. A method as defined in claim 4 wherein said liquid suspending vehicle further comprises an antisettling agent.

6. A method as defined in claim 5 wherein said intermetallic is $Al_3Ta$.

* * * * *

UNITED STATES PATENT AND TRADEMARK OFFICE
CERTIFICATE OF CORRECTION

PATENT NO. : 5,413,816
DATED : May 9, 1995
INVENTOR(S) : R.V. Sara

It is certified that error appears in the above-identified patent and that said Letters Patent is hereby corrected as shown below:

Column 3, line 41, "$A_{13}Ti$" should be --$Al_3Ti$--

Column 4, line 3, "$A_3Ta$" should be --$Al_3Ta$--

Signed and Sealed this

Nineteenth Day of March, 1996

*Attest:*

BRUCE LEHMAN

*Attesting Officer*     *Commissioner of Patents and Trademarks*